United States Patent [19]

Russell et al.

[11] Patent Number: 5,185,989
[45] Date of Patent: Feb. 16, 1993

[54] MUSHROOM HARVESTING

[75] Inventors: Tony A. Russell, Norfolk; Geoffrey C. Wheeler, Cornwall, both of England

[73] Assignee: Priorlucky Limited, Norfolk, England

[21] Appl. No.: 694,987

[22] Filed: May 3, 1991

Related U.S. Application Data

[63] Continuation-in-part of Ser. No. 608,213, Nov. 2, 1990, Pat. No. 5,058,368.

[30] Foreign Application Priority Data

May 4, 1990 [GB] United Kingdom ............... 9010128

[51] Int. Cl.⁵ ............................................. A01D 46/00
[52] U.S. Cl. ..................................... 56/13.1; 56/327.1; 56/DIG. 8
[58] Field of Search ............... 56/327.1, 12.9, 13.1, 56/10.2, 328.1, DIG. 8, DIG. 15

[56] References Cited

U.S. PATENT DOCUMENTS

| | | | |
|---|---|---|---|
| 3,635,005 | 1/1972 | Persson | 56/327.1 |
| 4,472,929 | 9/1984 | MacCanna et al. | 56/327.1 |
| 4,545,186 | 10/1985 | MacCanna | 56/327.1 |
| 5,058,368 | 10/1991 | Wheeler | 56/327.1 X |

Primary Examiner—Terry Lee Melius

[57] ABSTRACT

An automated mushroom harvester has a carriage adapted to be moved over a mushroom-growing area, a picking head assembly being mounted on the carriage. The assembly includes a pneumatic ram mounted for rotation about its own axis, the ram piston rod being non-rotatable with respect to the ram cylinder. A suction cap is mounted on the lower end of the rod, and control means is provided for the supply of air to and from the ram. The control means is operated to drive the ram in such a way as to maintain substantially constant the speed of the suction cap as it approaches a mushroom to be harvested, and to ensure the maximum energy of the moving parts of the picking head assembly is below 0.25 Joules, during that constant speed approach.

13 Claims, 5 Drawing Sheets

MUSHROOM HARVESTING

This application is a continuation-in-part of U.S. patent application Ser. No. 608,213, filed Nov. 2, 1990, which issued as U.S. Pat. No. 5,058,368 on Oct. 22, 1991.

BACKGROUND TO THE INVENTION

1. Field of the Invention

This invention relates to a picking head assembly suitable for incorporation in an automated mushroom harvesting apparatus, as well as to methods of operating such a picking head assembly. The invention further relates to an automated mushroom harvesting apparatus whenever incorporating a picking head assembly of this invention, and to methods of operating such automated mushroom harvesting apparatus.

2. Description of the Prior Art

The growing and harvesting of mushrooms—and particularly of the species *agaricus*—on a commercial scale is a most labour-intensive industry, in which approximately 75% of the work-force is engaged in the process of harvesting (picking) the growing maturing fruit bodies (mushrooms). In many countries, there is an increasing demand for commercially-produced mushrooms but, on account of the labour-intensive nature of the business, it is difficult for producers to keep pace with the demand. Mushroom picking is generally low-level poorly-paid work and the labour turnover rates tend to be high. If therefore the picking process could be automated, the industry would obviously benefit.

The automated picking of mushrooms is hampered by the difficulty that mushrooms bruise easily and then discolour, or—if the mushrooms are subjected to slightly greater forces—the mushrooms tend to break apart or separate from their stalks. Preliminary trials with devices intended to assist the automated picking of mushrooms have shown a marked tendency to bruise or otherwise damage large numbers of the mushrooms and it has therefore become apparent that an economically-viable design of automatic mushroom harvester requires the provision of a picking head assembly able to operate at a high speed but which will damage only relatively few mushrooms.

Research work directed at minimising the damage when picking mushrooms automatically has shown that relatively low energy levels must be used at the moment when contact is established between a picking head and a selected mushroom. However, if the picking head is arranged to approach and contact a selected mushroom at a very low speed, to minimise the impact energy, the overall speed of the operation of the automated harvester will be very low and so only relatively few mushrooms will be picked within a given time, as compared to a manual picker. Moreover, complex control mechanisms must be provided to determine the precise position, relative to some datum, of the surface of the mushroom to be contacted by the picking head, because the height of growing mushrooms is so variable, in order that the approach speed of the picking head may suitably be reduced to a sufficiently low value just before contact takes place. This further complication reduces the reliability and increases the likelihood of damage to mushrooms, as well as further reducing the operating speed of the harvester.

OBJECTS OF THE INVENTION

The present invention stems from research into the automated picking of mushrooms, with the object of minimising damage to the mushrooms to be harvested, but also having the object of maintaining high picking rates. As a consequence of that research, it has been established that provided the overall energy levels of the moving components of a picking head assembly can be maintained at sufficiently low levels, there is no need for the speed of approach of the picking head to be reduced as the head approaches and contacts a mushroom, so obviating the requirement for accurately knowing the position of the surface of the mushroom to be contacted by the picking head, prior to the picking head approaching that mushroom.

SUMMARY OF THE INVENTION

In accordance with the foregoing and other objects, one aspect of this invention provides a method of operating an automated mushroom harvesting apparatus including a carriage, drive means to move said carriage over a mushroom growing area, and a picking head assembly mounted on said carriage and having moving components which are moved on operation of said picking head assembly towards a mushroom to be harvested. The picking head assembly comprises a pneumatic ram having a slidable piston rod and a suction head carried on the end of said rod remote from said carriage, and the apparatus further comprises pneumatic control means to control the supply of air to and from said ram. In the method, said drive means is operated to move the carriage thereby to bring the line of movement of said piston rod into alignment with a mushroom to be harvested, and said control means is then operated to cause sliding movement of said piston rod thereby to move said suction head towards said mushroom. The pneumatic control means is operated in such a way as to cause the rate of movement of the suction head to be substantially constant as the suction head approaches said mushroom and to maintain the total kinetic energy of said moving components of the picking head approaching said mushroom at not more than 0.25J.

It will be appreciated that in the operating method of this invention, the suction head of the picking head is moved towards a selected mushroom at a substantially constant rate at least during the final approach to a mushroom, until contact takes place. Thus, there is no need for the vertical position of the surface of the mushroom to be known in advance of the approach of the head to that mushroom, for the speed of approach of the head does not have to be deliberately reduced immediately prior to contact taking place. Then, to ensure the likelihood of damage to the mushroom is maintained at an acceptably low level, the kinetic energy of the moving components should be no greater than 0.25 Joules (J), during that final approach.

According to a second aspect of this invention, there is provided a picking head assembly for incorporation in an automated mushroom harvesting apparatus including a carriage arranged for movement over a growing area, which picking head assembly has a pneumatic ram for mounting on the carriage, the pneumatic ram having a slidable piston rod the line of movement of which may be positioned by moving said carriage to intersect a selected mushroom to be harvested, and a resiliently deformable suction head mounted on the free end of the piston rod remote from said carriage, which said suction head is adapted to contact a selected mushroom on operation of the ram and then to hold by suction that mushroom. Pneumatic control means are provided for controlling the supply of air to the ram, and are arranged to control the speed of approach of said suction head to a selected mushroom so as to maintain the kinetic energy of the moving components of the picking head at less than 0.25J at the time of contact between said suction head and a selected mushroom.

BRIEF DESCRIPTION OF THE DRAWINGS

In order that the invention may better be understood, it will now be described in greater detail, and for the purposes of illustration on specific embodiment of picking head of this invention will also be described, reference being made as necessary to the accompanying drawings, in which.

DESCRIPTION OF THE PREFERRED EMBODIMENTS

Figure 1:
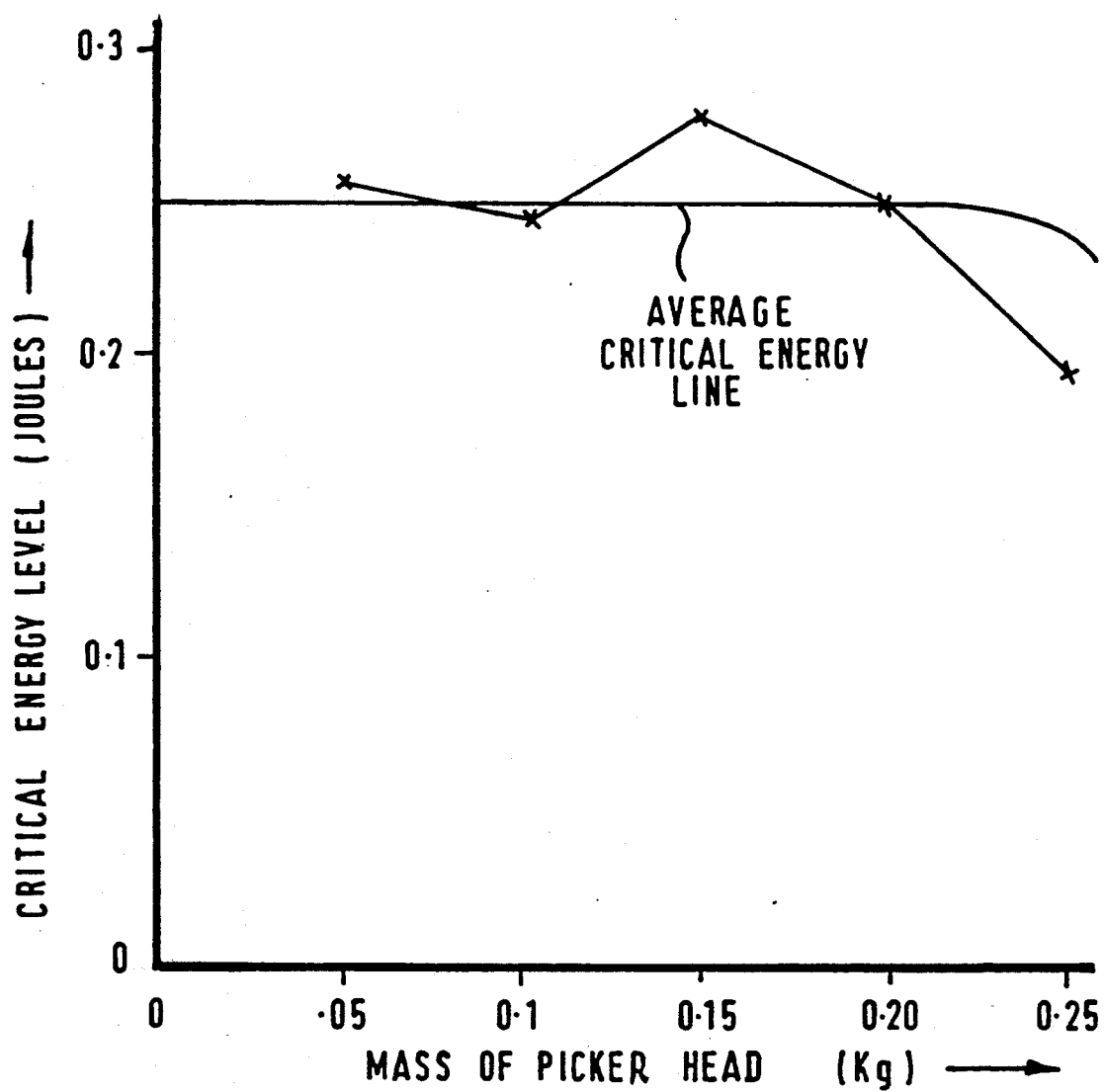
FIG. 1 is a graph plotting critical impact energy levels against the mass of a picker head.

Preferred features of the invention and a specific example there of will now be described in detail.

In order to maintain picking rates at acceptably high levels, it is important that the picking head assembly is operated as quickly as possible; thus the carriage should be positioned over a mushroom to be harvested by rapid movement of that carriage, followed by operation of the ram at as high a rate as possible consistent with the kinetic energy level defined hereinbefore. In turn, the mass of the moving components of the picking head must also be kept as low as possible, consistent with strength requirements, to allow for rapid operating speeds for the ram. In view of this, the mass of the moving components should be less than 0.25 kg, and the approach speed of the suction head should be maintained at not more than 2 m/s. Typically, the approach speed may be in the range of from 1.5 m/s to 2 m/s, with the mass of the moving components being from 0.14 kg to 0.085 kg.

A particularly advantageous operating method for the picking head assembly is to supply compressed air to the pneumatic ram at the commencement of the operation of the ram, so as to accelerate the suction head towards a mushroom to be picked; shortly thereafter, a restriction is placed on the exhaust from the ram to limit the speed of movement whilst allowing the suction head to continue movement towards a mushroom until contact therewith is established. Then, and following the attachment of the suction head to the mushroom by a suction technique, the direction of movement of the ram should be reversed, so as to draw the mushroom away from the growing area.

It is greatly preferred for the suction head to be connected to a sub-atmospheric pressure source throughout the movement of the suction head towards a mushroom to be harvested and subsequently during the movement of the head away from the contact position. In this way, air will be drawn through the suction head until the head contacts a mushroom; thereupon, the pressure within the suction head will fall and the suction head will attach itself to the contacted mushroom. Moreover, this drop in pressure within the suction head, and so also in the associated pipes connecting the suction head to the sub-atmospheric pressure source, may be used to detect that contact with a mushroom has occurred, and so to control the reversal of the ram movement.

Most preferably, the suction head is twisted about the axis of the head immediately after contact has been established between the suction head and a mushroom, whereby such twisting action takes place either before or during the commencement of the reverse movement of the ram. Such a twisting action may serve to break the stalk of a mushroom away from the mycelium within the growing medium, whereby the mushroom may easily be picked from the growing area without breaking the stalk and without significantly disturbing the mycelium. Tests have shown that such twisting movement of the suction head preferably is effected through an angle of from 30°–90°, in order effectively to assist severance of the stalk from the mycelium.

So that the kinetic energy of the moving components of the picking head may be maintained at less than 0.25 J, the mass of those moving components must be as low as possible, and preferably less than 0.25 kg, but more preferably within the range of 0.085 kg to 0.15 kg. The components of the ram should therefore be manufactured from low-density materials consistent with the strength requirements for the ram—and so for example from aluminium or aliminium alloys, or plastics materials. Moreover, in order to minimise the air pressure required to expand the ram at an acceptable rate, it is preferred for the pneumatic ram to have the piston and rod thereof freely slidable within the ram cylinder with a minimum of friction therebetween. Advantageously, no seals are employed between the piston and ram cylinder, the piston being a loose fit within the cylinder so as thereby to minimise friction within the ram.

In a case where the suction head is to be twisted about the axis of the ram in order to assist severance of a mushroom from the mycelium before or during commencement of a contraction stroke of the ram, it is preferred for the ram to be adapted for rotatable mounting on the carriage, the piston rod being non-rotatably disposed within the ram cylinder, and means being provided to effect rotation of the ram about its own axis. Conveniently, this may be achieved by providing the ram cylinder with a polygonal, and preferably square, bore, the piston rod having a correspondingly-shaped piston mounted within the bore whereby rotation of the cylinder will effect corresponding rotation of the piston rod.

Reference will hereinafter be made to the accompanying drawings, in illustrating one specific example of the invention.

Presuming that a picker head assembly for harvesting mushrooms includes a support member carrying a suction head which is moved towards a selected mushroom for harvesting, a series of tests were conducted in an attempt to determine the maximum kinetic energy level for those components which are moved towards the selected mushroom and which are stopped by the impact between the suction head and the selected mushroom, consistent with minimal damage occurring to the selected mushroom. A typical acceptable damage rate for commercially-grown and harvested mushrooms is 10%, and so the critical impact energy level was deemed to be that energy level at which 90% of typical commercially-grown mushrooms of the species Agaricus remained undamaged. For the purpose of these tests, damage included the stalk being driven into the growing medium, as well as more apparent damage such as the cap of the mushroom breaking or separating from its stalk.

FIG. 1 is a plot of the critical kinetic values as determined from a series of tests on commercially-grown mushrooms, plotted against the mass of the picker head with which the impact with the mushrooms was established. For this test, mushrooms of sizes within the range of 35 mm to 45 mm cap diameter were chosen. From that graph, it can be deduced that the average critical impact energy level was substantially constant for picker head masses below 0.25 kg, the corresponding energy value being 0.25 J. When the picker mass exceeded 0.25 kg, it was found to be sufficiently high to cause some damage to a significant number of mushrooms, even with velocity at impact being reduced to zero.

Figure 2:
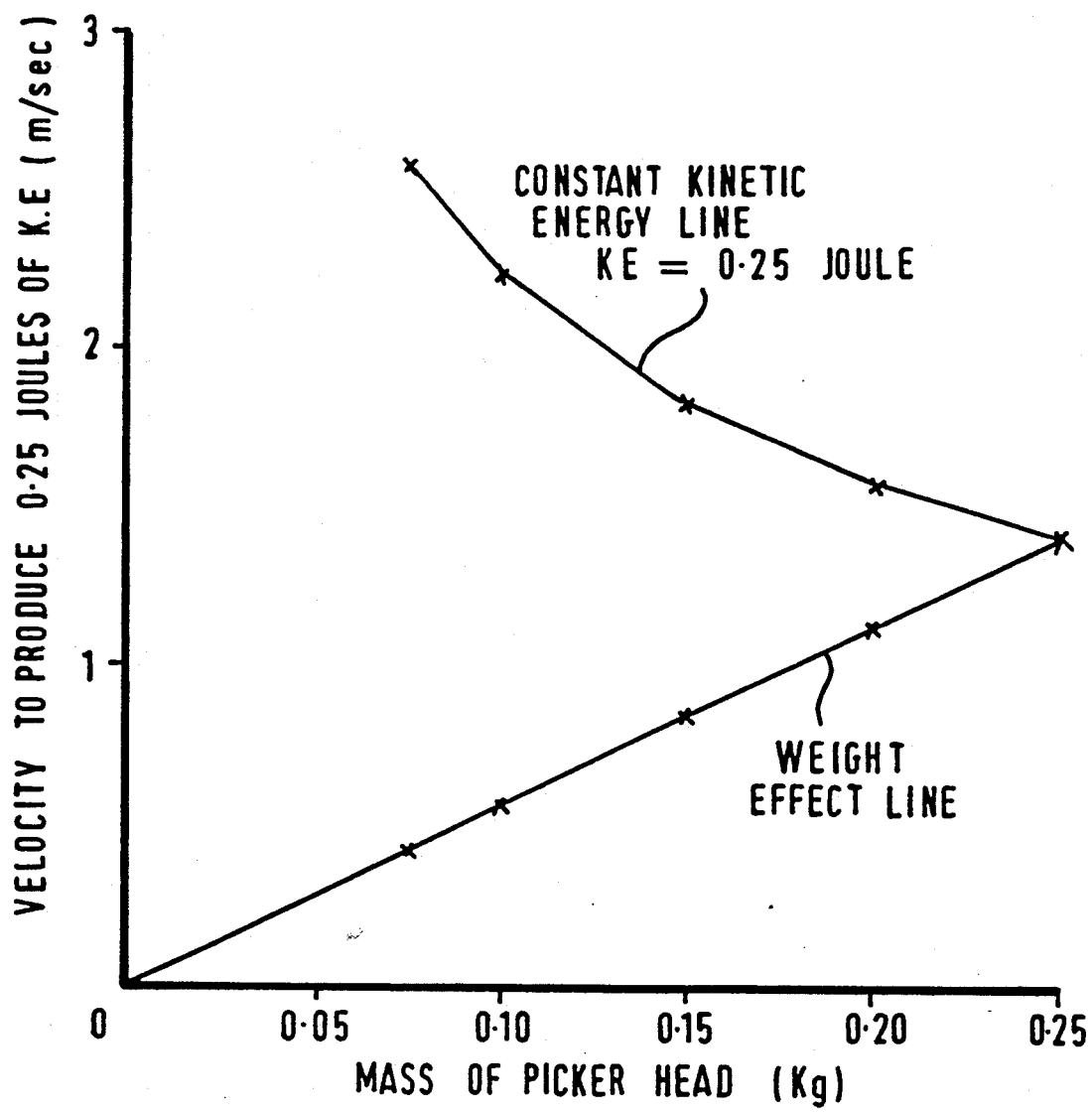
FIG. 2 is a graph plotting the mass of the picker head against velocity.
Figure 3:
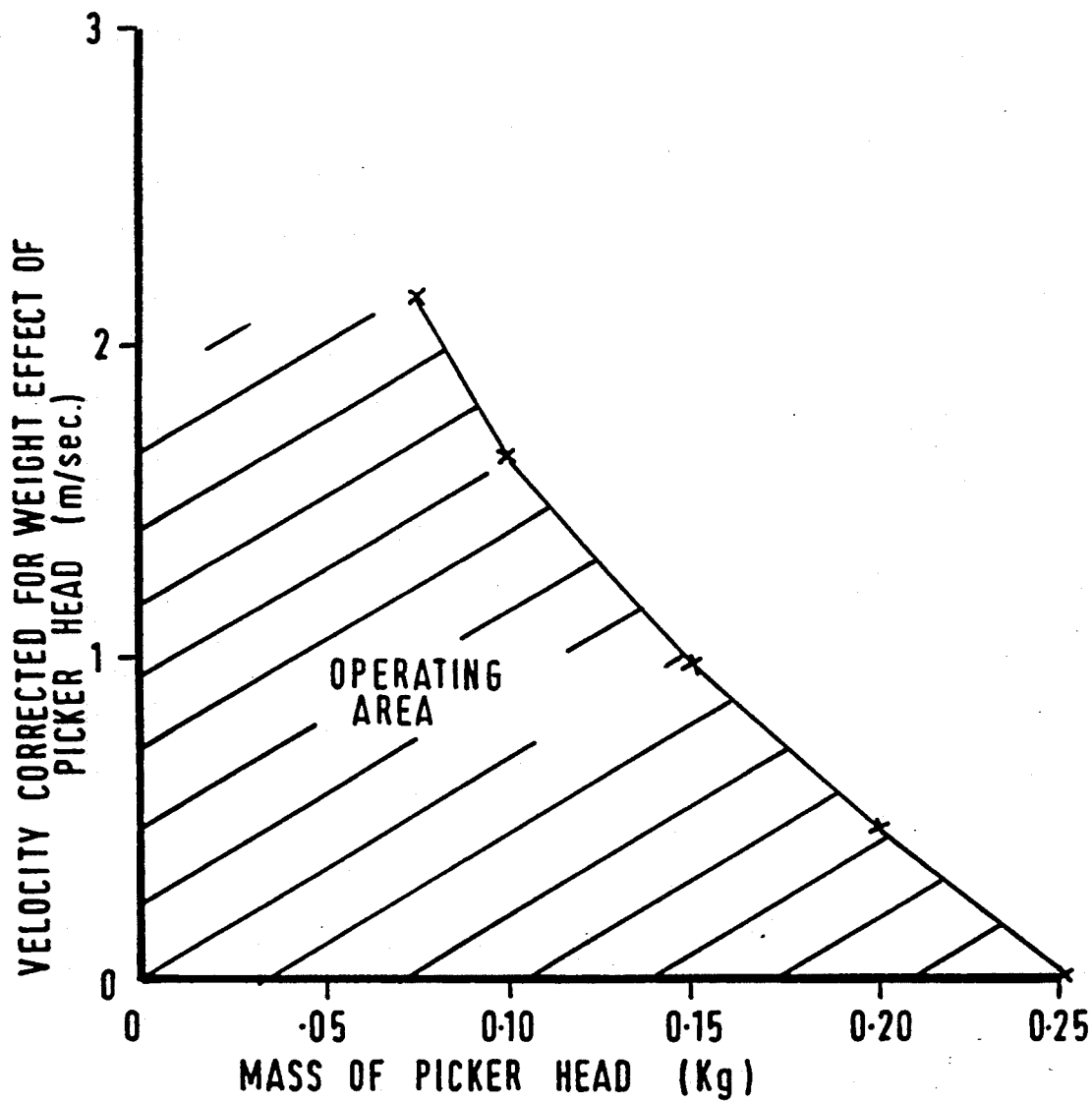
FIG. 3 is a graph plotting the mass of a picker head against velocity, corrected for the weight effect of the picker head.

Calculations were then performed to determine the maximum velocity for picker heads of various masses, to give rise to the critical kinetic energy value of 0.25 J, at impact. The results are shown in FIG. 2, where velocity is plotted against the picker head mass. Also shown on this Figure is a weight-effect line, based on the presumption that the damaging effect of pure weight (which it has been found is sufficient to cause damage to mushrooms with zero impact velocity when the picker head mass reaches 0.25 kg) reduces linearly to zero with reducing weight. The vertical distance between the weight-effect line and the critical constant kinetic energy line represents the maximum velocity at impact for a given picker head mass to give rise to the critical energy value corrected for the weight-effect, and this corrected velocity is plotted in FIG. 3 against the mass of the picker head. From this, it can be seen that in order to ensure not more than 10% of typical commercially-grown mushrooms are damaged to any significant extent, the picker head mass and the impact velocity must together fall below the critical line shown in FIG. 3.

Figure 4:
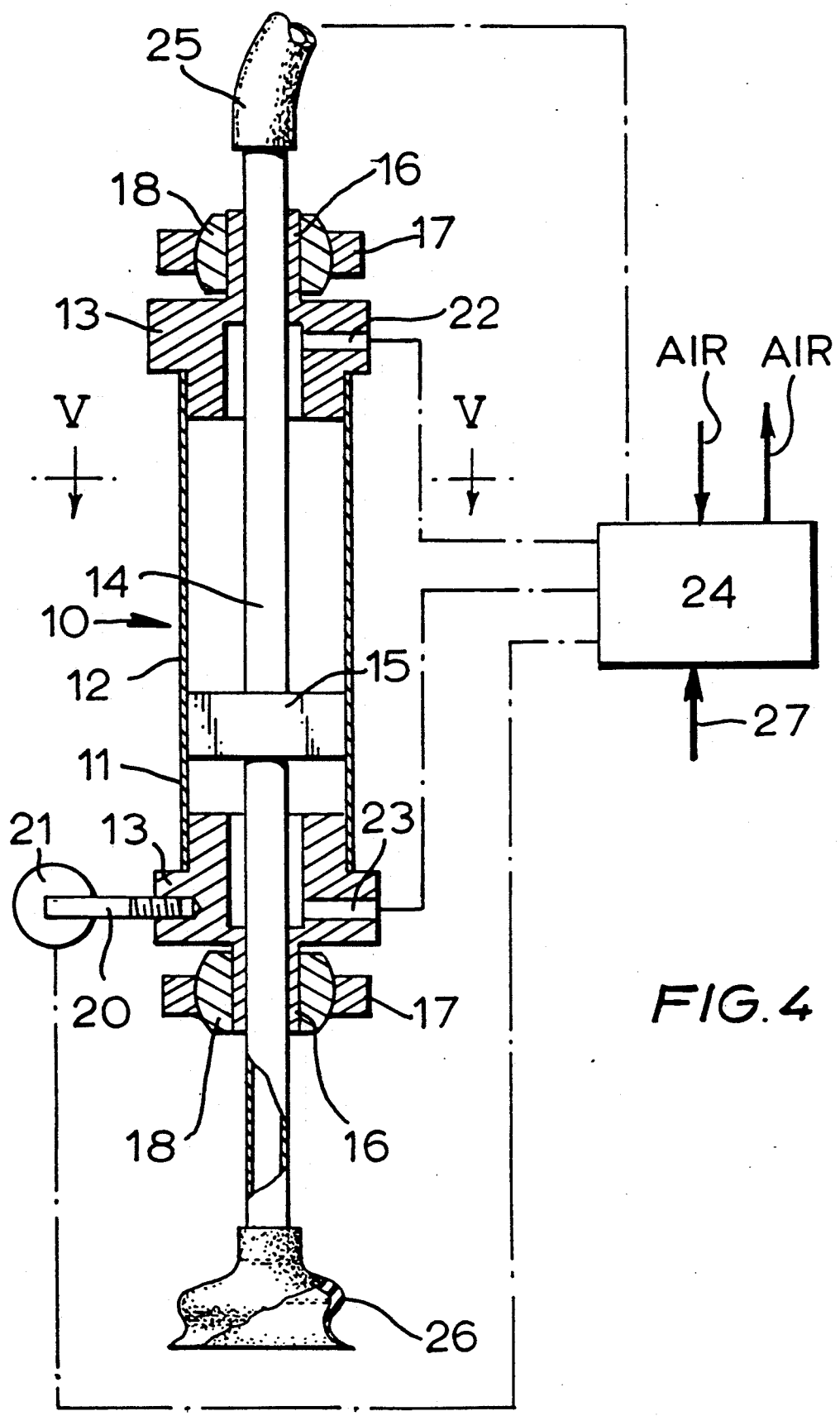
FIG. 4 is a diagrammatic sectional view through a picker head assembly constructed and arranged in accordance with this invention.
Figure 5:
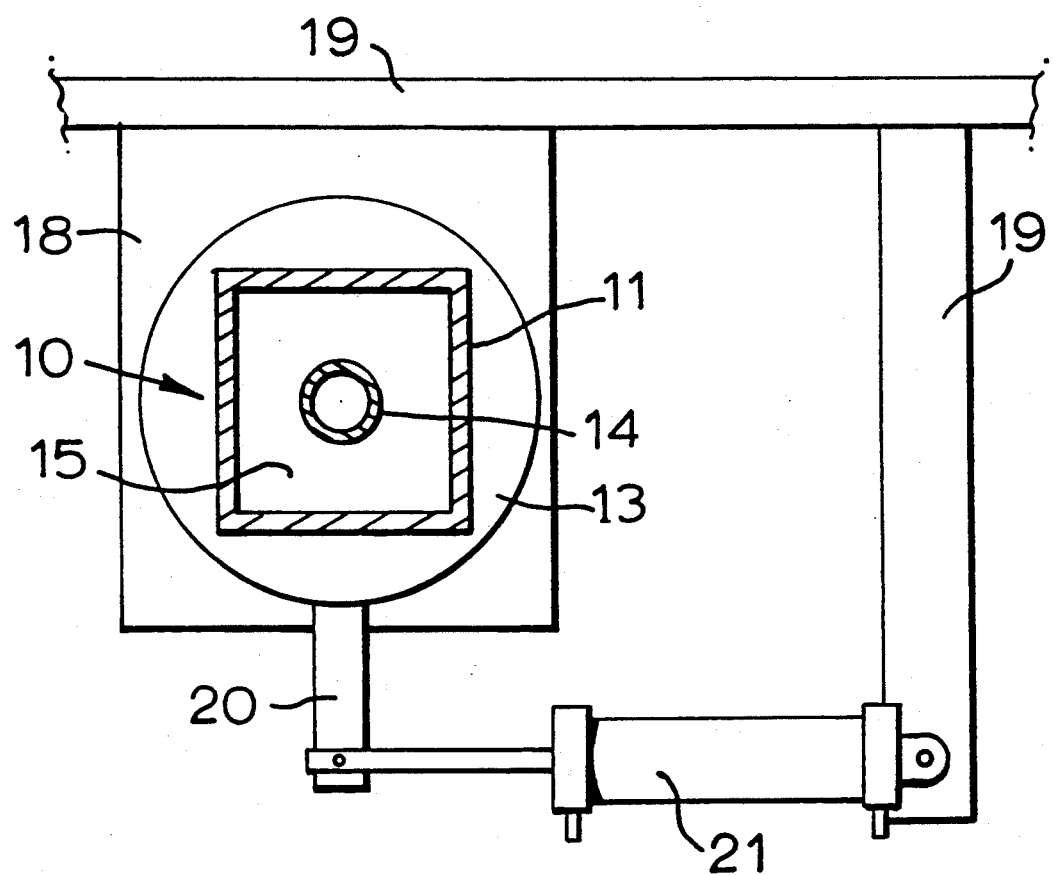
FIG. 5 is a section through the head of FIG. 4, taken on line V—V marked on that Figure.

FIGS. 4 and 5 show a typical picker head assembly arranged and constructed in accordance with this invention. This picker head assembly comprises a pneumatic ram 10 having a cylinder 11 fabricated from a length of thin-wall square section tube 12, and a pair of end caps 13 having coaxial circular bores in which is slidably located a piston rod 14 carrying a piston 15 disposed within the tube 12. The piston 15 is of a shape corresponding closely to that of the internal shape of the tube 12, but is a clearance running fit within that tube 12 so as to minimise friction therewith, there being no gas seals employed between the piston and the tube.

Each end cap 13 has a circular boss 16 which is journalled on an associated mounting bracket 17 by means of a bush 18, whereby the cylinder is held in a fixed axial position between the two brackets 17. The brackets 17 form part of a carriage of a mushroom harvester, which carriage is shown in part at 19 and which is movable over a mushroom growing area under the control of a suitable two-axis drive mechanism.

The lower end cap 13 has a crank arm 20 projecting radially therefrom, a further pneumatic ram 21 linking that crank arm to the carriage 19, whereby expansion and contraction of the ram 21 causes the cylinder 11 to rotate about its own axis. The ram 21 may be spring-urged to one limiting position whereby air under pressure may drive the ram to its other limiting position against the spring bias.

Ports 22 and 23 are provided at the two ends respectively of the cylinder 11, which ports are connected to a pneumatic controller 24. The piston rod 14 is hollow, and a flexible pipe 25 connects the upper end of that piston rod to the controller 24. At the lower end of the piston rod 14, there is provided a soft resilient suction head 26, which suction head is appropriately configured for contacting the upper surface of a growing mushroom and then effecting a seal thereagainst, whereby the connection of the pipe 25 to a low pressure source will cause the mushroom to be securely held by the suction head 26.

The controller 24 is connected both to a sub-atmospheric pressure source and to a super-atmospheric pressure source, and is arranged to perform a preset operation cycle on receiving an electrical trigger signal 27. This causes the picker head assembly to operate through one complete cycle, picking a selected mushroom.

The mass of the moving components comprising the piston 15, the piston rod 14 and the suction head 26, as well as part of the pipe 25, are maintained as low as possible, consistent with the strength requirements for those components. Typically, the piston rod 14 and piston 15 are made from an aluminium alloy material, with the suction head 26 being made from a soft resilient synthetic plastics material. The piston rod 14 and piston 15 may instead be made of a plastics material. Moreover, a relatively flexible pipe 25 is employed, in order that the pipe may have minimal influence on the movement of the piston rod 14. A typical mass for the moving parts including the piston rod 14, piston 15 and suction head 26 should be in the range of from 0.14 kg down to 0.085 kg.

In use, the carriage 19 is moved so that the line of action of the piston rod 14 will intersect the approximate centre of a mushroom to be harvested. A trigger signal 27 is then applied to the controller 24, which causes the sub-atmospheric pressure source to be connected to the pipe 25, and also causes compressed air to be supplied to port 22, so driving the piston 15 downwardly. Shortly afterwards, the venting of port 23 is restricted, so limiting the speed of movement of the ram 10. The piston rod 14, and so also the suction head 26, move downwardly until the suction head 26 contacts the mushroom; the downward movement of the head 26, piston rod 14 and piston 15 is thereby arrested by the impact with the mushroom. Simultaneously, the pressure in pipe 25 drops, as the suction head seals against the mushroom, and this drop in pressure is detected by the controller 24. On detection of the pressure drop, air under pressure is applied to port 23, whilst port 22 is vented, so as to drive the piston 15 upwardly. Simultaneously, the controller 24 operates ram 21, so causing the cylinder 11 to be turned about it own axis and, in view of the corresponding shapes of the tube 12 and piston 15, the suction head 26 also is turned. This breaks the stalk of the mushroom away from the mycelium in the growing medium, so that the mushroom complete with its stalk may be lifted from the growing medium on upward movement of the piston rod 14.

The pressure of the air supplied to port 22, as well as the restriction placed on port 23, are selected so that the impact energy of the suction head 26 with a mushroom is less than 0.25 J. Typically, therefore, the approach speed of the suction head 26 will be in the range of 1.5 m/s to 2 m/s, with the mass of the moving components being as described hereinbefore.

We claim:

1. A method of operating an automated mushroom harvesting machine including a carriage, drive means to move said carriage over a mushroom growing area, a picking head assembly mounted on said carriage and having moving components which are moved on operation of said picking head assembly towards a mushroom to be harvested, said picking head assembly comprising a pneumatic ram having a slidable piston rod and a suction head carried on the end of said rod remote from said carriage, the apparatus further comprising pneumatic control means to control the supply of air to and from said ram, the method comprising the steps of: moving said carriage to bring the line of movement of said piston rod into alignment with a mushroom to be harvested, moving said piston rod thereby to move said suction head towards said mushroom, controlling the rate of movement of said suction head with said pneumatic control means to be substantially constant as the suction head approaches said mushroom at not more than 0.25 J.

2. A method according to claim 1, including, maintaining the mass of said moving components at less than 0.25 kg.

3. A method according to claim 1, including maintaining the approach speed of the suction head towards a mushroom to be harvested at not more than 2 m/s.

4. A method according to claim 1, including supplying air under pressure to said pneumatic ram at the commencement of sliding movement of said piston rod, whereby the suction head is accelerated towards a mushroom to be picked; and shortly thereafter restricting the venting of air exhausted from the ram to limit the speed of movement of the suction head whilst allowing the head to continue movement towards a mushroom until contact therewith is established.

5. A method according to claim 1, including connecting said suction head to a sub-atmospheric pressure source throughout the movement of the suction head towards a mushroom to be harvested, and subsequently during the movement of said suction head away from a mushroom-contacting position.

6. A method according to claim 5, including initiating reversal of the piston rod movement on detection of a drop in air pressure within said suction head caused by contact of said suction head with a mushroom to be harvested.

7. A method according to claim 1, including twisting said suction head about the axis of said head immediately after contact has been established between said suction head and a mushroom to be harvested.

8. A picking head assembly for incorporation in an automated mushroom harvesting apparatus including a carriage arranged for movement over a growing area, which picking head assembly has a pneumatic ram for mounting on the carriage, the pneumatic ram having a slidable piston rod the vertical line of movement of which may be positioned by moving said carriage to intersect a selected mushroom to be harvested, a resiliently deformable suction head mounted on the free end of the piston rod remote from said carriage, which said suction head is adapted to contact a selected mushroom on operation of the ram and then to hold by suction that mushroom, and pneumatic control means for controlling the supply of air to the ram, in which picking head assembly said control means is arranged to control the speed of approach of said suction head to a selected mushroom so as to maintain the kinetic energy of the moving components of the picking head at less than 0.25 J at the time of contact between said suction head and a selected mushroom.

9. A picking head assembly according to claim 8, in which the mass of the moving components which are moved on operation of said ram by said control means are maintained at less than 0.25 kg.

10. A picking head assembly according to claim 9, wherein said mass lies within the range of 0.085 kg to 0.15 kg.

11. A picking head assembly according to claim 8, in which said ram includes a ram cylinder and a piston mounted on said piston rod, said piston rod and piston being freely slidable within said ram cylinder, without the provision of seals between the piston and ram cylinder.

12. A picking head assembly according to claim 8, in which said ram is adapted for rotatable mounting on the carriage, said piston rod being non-rotatably disposed within the ram cylinder, and means being provided to effect rotation of said ram about its own axis.

13. A picking head assembly according to claim 12, in which said ram cylinder has a polygonal bore, and said piston rod has a correspondingly-shaped piston mounted within the bore.

* * * * *